(12) United States Patent
Kanaris

(10) Patent No.: US 7,228,952 B2
(45) Date of Patent: Jun. 12, 2007

(54) CONVEYOR ROLLER SHAFT SUPPORT FOR DAMPENING VIBRATIONS

(75) Inventor: Alexander Kanaris, Richmond Hill (CA)

(73) Assignee: Van Der Graaf Inc., Brampton, Ontario (CA)

( * ) Notice: Subject to any disclaimer, the term of this patent is extended or adjusted under 35 U.S.C. 154(b) by 0 days.

(21) Appl. No.: 10/915,411

(22) Filed: Aug. 11, 2004

(65) Prior Publication Data

US 2006/0032724 A1    Feb. 16, 2006

(51) Int. Cl.
*B65G 13/00*    (2006.01)
(52) U.S. Cl. ...................................... 193/37; 193/35 R
(58) Field of Classification Search ................. 193/37, 193/35 R
See application file for complete search history.

(56) References Cited

U.S. PATENT DOCUMENTS

| | | | |
|---|---|---|---|
| 2,244,197 A * | 6/1941 | Hessler | 384/569 |
| 3,301,612 A * | 1/1967 | Thomas | 384/536 |
| 4,684,010 A | 8/1987 | Hutter et al. | |
| 5,415,272 A * | 5/1995 | Boschert et al. | 198/780 |
| 5,645,155 A | 7/1997 | Houghton | |
| 5,678,676 A * | 10/1997 | Pierson | 193/37 |
| 6,267,373 B1 * | 7/2001 | Takata | 271/274 |
| 6,367,617 B1 | 4/2002 | Schiesser et al. | |
| 6,536,953 B1 * | 3/2003 | Cope et al. | 384/536 |
| 6,547,054 B2 * | 4/2003 | Gamache | 193/37 |
| 6,726,003 B2 * | 4/2004 | Itoh et al. | 198/788 |

FOREIGN PATENT DOCUMENTS

JP    409293323    * 11/1997

* cited by examiner

*Primary Examiner*—Douglas Hess
(74) *Attorney, Agent, or Firm*—Hoffman &Baron, LLP

(57) ABSTRACT

A shaft support or mount for supporting a conveyor roller and for dampening the vibrations of the conveyor roller or conveyor roller assembly in operation, by providing flexible connection structure in the shaft support, which is usually comprised of rubber. A method of dampening the transmittal of vibrations from a conveyor roller by providing a flexible connection structure in the shaft support.

15 Claims, 2 Drawing Sheets

CONVEYOR ROLLER SHAFT SUPPORT FOR DAMPENING VIBRATIONS

FIELD OF THE INVENTION

This invention relates generally to supports for conveyor rollers, and particularly relates to providing a shaft support which dampens the vibrations in a conveyor roller, while supporting the shaft of the conveyor roller. This invention also relates to a method of dampening the transmittal of vibrations from a conveyor roller while in operation.

BACKGROUND ART

A variety of support mechanisms or brackets for mounting, supporting or retaining conveyor rollers to conveyor roller assemblies or systems have heretofore been designed and utilized.

One example of such shaft support mechanism is shown in U.S. Pat. No. 6,367,617 B1. This patent relates to a shaft support comprising of a mounting yoke and a receiving block which is pivotally mounted to the yoke by a pair of pivot pins. The receiving block receives the shaft portion of the roller. The shaft support is pivotable about an axis extending generally along the direction of conveyance of a conveyor. The shaft support is further pivotable about a second axis which extends generally perpendicular.

Other examples of mounting or supporting structures for conveyor rollers can be found in the prior art.

In addition to mounting or supporting a conveyor roller, it is desirable to minimize the vibrations and level of noise produced by a conveyor roller or conveyor assembly in operation. For example, U.S. Pat. No. 4,684,010 shows a vibration conveyor having a working mass drivable in vibrations, a counter mass which is also driven via the working mass in vibrations which are transferred to a support or a mounting base, and a device for dampening or reducing the transmission. The device for dampening or reducing the transmission includes a plurality of roller bearing elements provided between the vibrating conveyor and a mounting base, where each is formed as a unit including two bearing shells with running tracks and at least one roller part between the running tracks. The running tracks before and after the roller part is inclined in opposite direction in form of a predetermined curve, and when the counter mass is driven in rotation the counter mass and the mounting base are pressed from one another by the roller bearing element, which results in dampening relative to the mounting base.

Another example is shown in U.S. Pat. No. 5,645,155 which relates to a conveyor roller noise-isolator and wear-prevention system for mounting a conveyor roller to a conveyor system support frame. An apparatus is provided in which a conveyor roller axle is mounted to a conveyor side frame by a resilient bushing which serves to isolate the noise generated at the roller, to prevent the noise generated at the interface between the axle and the frame, and further to prevent wear on the axle and the frame. The bushing eliminates metal-to-metal contact at the mount interface and by having interference fits with the axle and with the frame to prevent relative motion.

U.S. Pat. No. 5,678,676 relates to the mounting for a roller shaft in the frame of a conveyor designed to reduce the vibration of the shaft and the sound produced during conveyor operation. In several embodiments, the end of the shaft is provided with a taper, and a spring which is internal to the roller is used to bias the taper into the mounting hole. The resulting tight fit of the taper in the hole greatly reduces the vibration energy of the shaft. In another embodiment, a bushing separates the shaft and the hole and is designed to grip the shaft as it is pressed into place in the hole.

It is an object of this invention to provide an improved mechanism for supporting or mounting the shaft of a conveyor roller to the conveyor assembly while effectively reducing the transmittal of vibrations of the conveyor roller, and thus the noise level, produced by the conveyor roller assembly in operation.

It is another object of the invention to reduce the tendency of fastening means to loosen under a vibrational environment.

It is a further object of this invention to provide for a more cost effective, durable and simpler apparatus to support a roller shaft end.

It is a further object of this invention to provide an improved method for dampening of vibrations in a conveyor roller assembly, and thus reducing the overall noise produced by same.

DISCLOSURE OF INVENTION

It is a further aspect of this invention to provide a shaft support for supporting at least one end of a shaft of a conveyor roller. The shaft support comprises of spaced first and second support; flexible connection structure for connecting the first and second support; the first support including a structure to capture at least one end of said shaft. In one embodiment, the flexible connection is comprised of rubber or the like.

It is yet a further aspect of this invention to provide a roller shaft support for supporting one end of a conveyor roller, at a conveyor having a frame, comprising spaced first and second support means; flexible connection means for connecting said first and second support means; first support means including means to receive said one end of a conveyor roller; and second support means including means for fastening the shaft support to the frame of a conveyor assembly.

It is yet a further aspect of the invention to provide a method of dampening the transmittal of vibrations from a conveyor roller to a conveyor assembly by providing flexible connection means between the conveyor roller and the conveyor assembly.

These and other objects and features of the invention shall now be described in relation to the following drawings.

BEST MODE FOR CARRYING OUT THE INVENTION

Figure 1:
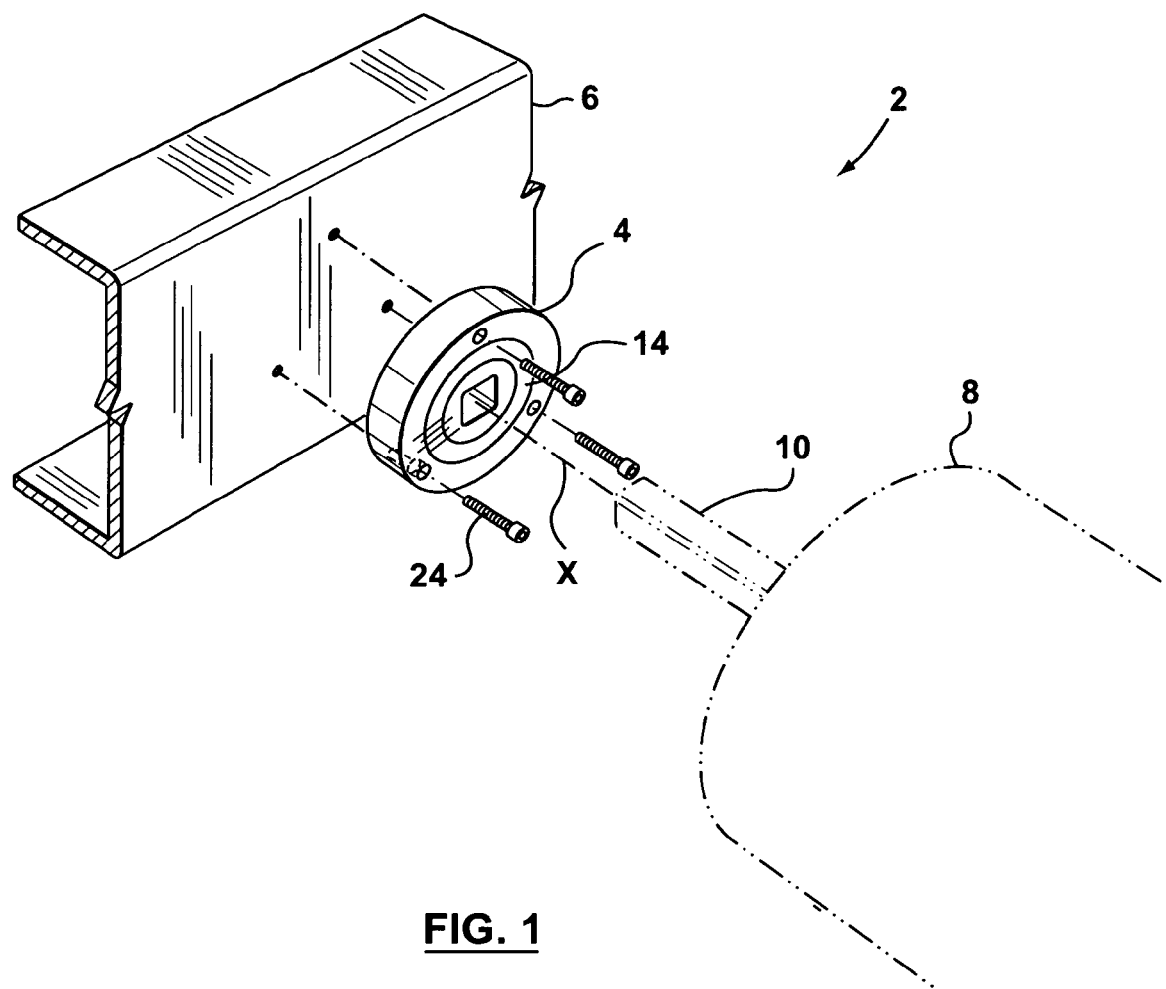
FIG. 1 is an exploded view of the shaft support, the frame and the conveyor assembly.

In the description, which follows, like parts are marked throughout the specification and in the drawings with the same respective reference numerals. The drawings are not necessarily to scale and in some instances proportions may have been exaggerated in order to more clearly depict certain features of the invention.

Figure 2:
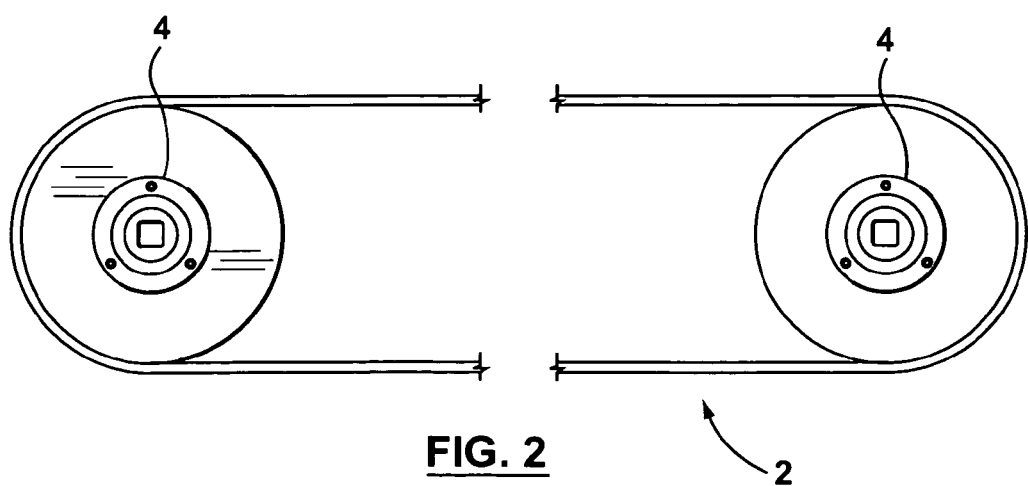
FIG. 2 is a representative side view of the conveyor assembly with the frame removed showing the positioning of the shaft support.

FIG. 1 generally illustrates a conveyor roller assembly 2 comprising of a conveyor roller 8, a shaft support or roller shaft support 4 and a frame 6. The conveyor roller 8 is received and supported by the shaft support 4. While at least one shaft support 4 is required, ideally two shaft supports 4 will be used, one on each end, to support each conveyor roller 8 in a conveyor roller assembly 2. The conveyor roller assembly 2 comprises of at least two conveyor rollers 8 as shown in FIG. 2. Moreover, the invention can be utilized for drum rollers, idler rollers, or the like.

The shaft support 4 in one embodiment may be fastened to the frame 6 of the conveyor roller assembly 2 by fastening means 24. The frame 6 is usually comprised of a rigid material such as steel, aluminium or other suitable materials. The shaft support 4 receives the end of the shaft 10 of the conveyor roller 8 upon insertion of the end of the shaft 10 in the shaft support 4. The shaft support 4 is adapted to retain and support the shaft 10 of the conveyor roller 8. The shaft support 4 includes flexible connection means 14 which acts to dampen the vibrations of the conveyor roller 8 and conveyor roller assembly 2 in operation. This in turn, has the desired effect of reducing the noise level of the conveyor.

FIG. 2 illustrates the conveyor roller assembly 2 having two conveyor rollers 8. The position of the shaft support 4 is shown, with the frame 6 removed. In the preferred embodiment, two shaft supports 4, one to support each end of the shaft 10 of the roller 8, are used to mount and support each roller 8 to the frame 6 of the conveyor roller assembly 2.

Figure 3:
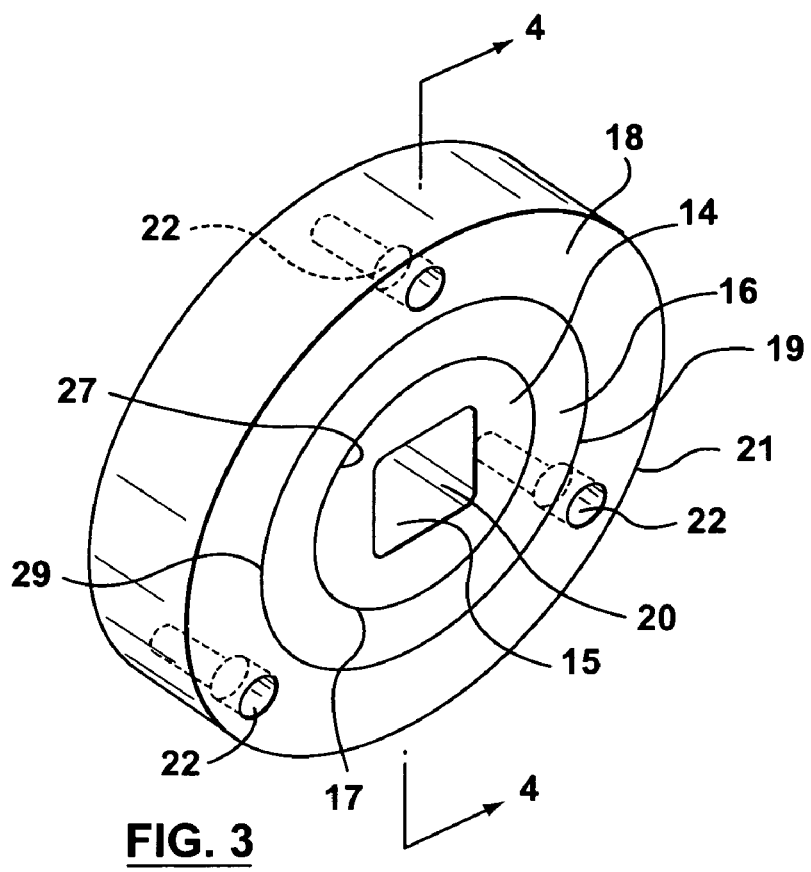
FIG. 3 is a perspective view of the shaft support.

FIG. 3 illustrates the shaft support 4 in isolation. Shaft support 4 comprises of spaced apart first support means 14 and second support means 18. First support means 14 and second support means 18 are usually made of metal or plastic or other materials which can resist wear and corrosion. First and second support means 14 and 18, respectively, are shown as generally circular or disc shaped. However, they can be of various shapes and sizes. Preferably, the first support means 14 and second support means 18 are comprised of the same material, however they may be of different materials without affecting the scope of the invention.

First support means 14 includes means to receive or capture the end of the shaft 10 of the conveyor roller 8 for retaining and supporting the conveyor roller 8. In the preferred embodiment, the first support means 14 includes an aperture 20 which receives the end of the shaft 10. The aperture 20 is preferably formed in a shape generally corresponding to the shape of the end of the shaft 10, which is to be received by the aperture 20. For example, the aperture 20 may be square or hexagonal shaped if the end of the shaft 10 is of such a shape or configuration, but it may be of other shapes. There could be a tight fit between the end of the shaft 10 and the aperture 20 so as to hold the shaft 10 securely in place when the conveyor roller 8 is in operation.

Second support means 18 includes means to capture fastening means 24 to fasten the shaft support 4 to the frame 6 of the conveyor roller assembly 2. The capturing means may be comprised of holes or bores 22 which receive the fastening means 24. The fastening means 24 which are adapted to be received by the holes 22 may include screws, bolts, nails, dowels, or the like.

First support means 14 and second support means 18 are connected together by flexible connection means 16, which is located in between first support means 14 and second support means 18. The flexible connection means 16 is comprised of a resilient material. Advantageously, the flexible connection means 16 is formed of natural or synthetic rubber or a rubber-like material, as such materials provide optimal vibration insulation and absorption qualities. The rubber may be vulcanized. The composition of the flexible connection means 16, for example being rubber, acts to absorb, dampen and reduce the vibrations which are generated by the conveyor roller 8 in operation. The dampening of the vibrations results in a reduction in overall noise produced by the conveyor operation. The flexible connection means 16 may be comprised of a material, other than rubber, which has absorption and insulation qualities.

First and second support means 14 and 18, respectively, and flexible connection means 16 all have a common axis X (see FIG. 1), and in one embodiment are of the same axial thickness.

The first and second support means 14 and 18 are generally annular in shape. First support means 14 has an inner surface 15 defining the aperture 20, and an outer surface 17. The second support means 18 has an inner surface 19 of a first radius and an outer surface 21 of a second radius. The flexible connection means 16 has an inner surface 27 adapted for connection or adherence to the first support means 14 and a second surface 29 adapted for connection or adhesion to the second support means 18.

Figure 4:
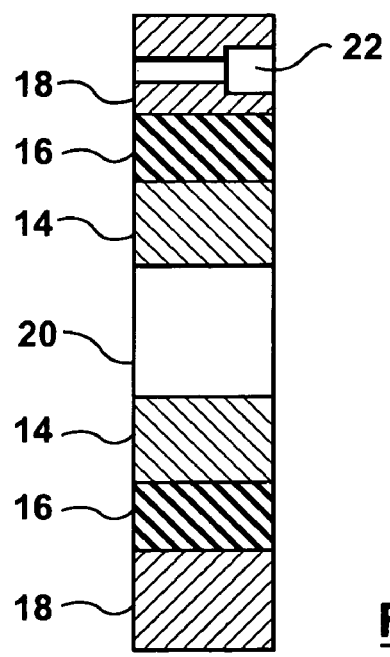
FIG. 4 is a cross-sectional view of the shaft support.

FIG. 4 illustrates the shaft support means 4 in cross section, which shows the first support means 14, the flexible connection means 16, the second support means 18, the aperture 20, and a hole 22.

The invention described herein also defines a method of dampening the transmittal of vibrations from a conveyor roller 8 to a conveyor roller assembly 2 by providing flexible connection means 16 between the conveyor roller 8 and the conveyor roller assembly 2. The flexible connection means 16 is comprised of a material which has vibration absorption and insulation qualities, such as rubber.

The method provides that the flexible connection means 16 is carried by a roller shaft support 4 which is fastened to the frame 6 of the conveyor roller assembly. The roller shaft support 4 is comprised of a first support means 4 and a second support means 18 which are connected together by the flexible connection means 16. The roller shaft support 4 is adapted to receive the end of a shaft 8 by presenting an aperture 20 within the first support means 14. The roller shaft support 4 carries or supports an end of the shaft 8 which is inserted into the aperture 20 of the first support means 14. In the preferred embodiment, two roller shaft supports 4 are used to support the conveyor roller 8, whereby each end of the conveyor roller 8 is inserted into a shaft support 4, which is fastened to the frame 6 of the conveyor assembly 2.

Various embodiments of the invention have now been described in detail.

Since changes in and/or additions to the above-described best mode may be made without departing from the nature, spirit or scope of the invention, the invention is not to be limited to said details.

I claim:

1. A shaft support for supporting at least one end of a shaft of a roller, comprising:
   (a) a first support means having an outer surface;
   (b) a second support means having an inner surface, said second support means spaced from and concentric with said first support means;
   (c) elastomeric means concentric with said first and second support means, said elastomeric means connected to said outer surface of said first support means and connected to said inner surface of said second support means;

(d) said first support means including means to capture said end of said shaft.

2. A shaft support as claimed in claim 1 wherein said elastomeric means is comprised of rubber.

3. A shaft support as claimed in claim 2 wherein said rubber is bonded to said outer surface of said first support means and said inner surface of said second support means.

4. A shaft support as claimed in claim 1 wherein said first support means has an aperture there through for receiving said shaft end.

5. A shaft support assembly as claimed in claim 4 wherein said aperture is square shaped.

6. A shaft support as claimed in claim 1 wherein said first and second support means are comprised of a rigid material of rubber.

7. A shaft support for supporting at least one end of a shaft of a roller comprising spaced first and second co-axial support means; rubber bonded to, and disposed concentrically between said first and second support means for connecting said first and second support means; said first support means including means to capture one end of said shaft wherein said second support means includes holes for receiving fastening means to fasten said shaft support to a conveyor roller assembly.

8. A roller shaft support for supporting at least one end of a conveyor roller, at a conveyor having a frame, comprising:
(a) a first support co-axially spaced from a second support, said first support and second support being substantially the same axial thickness;
(b) resilient material co-axially disposed between said first and second support, said resilient material being substantially the same axial thickness as said first and second support, said resilient material selected from the group of natural rubber and synthetic rubber, said resilient material adhering to said first and second support; and
(c) said first support including means to receive said one end of a conveyor roller.

9. A roller shaft support as claimed in claim 8 wherein said first and second support means are generally circular in shape.

10. A roller shaft support as claimed in claim 8 wherein said first support has an outer diameter and said second support has an inner diameter greater than said outer diameter of said first support means, said resilient material bonded to said outer diameter of said first support and inner diameter of said second support.

11. A roller shaft support for supporting at least one end of a conveyor roller at a conveyor having a frame comprising co-axially spaced first and second support means; vulcanized rubber co-axially disposed between said first and second support means and connected to said first and second support means; said first support means including means to receive said one end of a conveyor roller wherein said second support means has fastening means for fastening said roller shaft support to said frame.

12. A method of dampening the transmittal of vibrations from a conveyor roller to a conveyor assembly by providing elastomeric means between said conveyor roller and said conveyor assembly, said elastomeric means co-axially secured to said conveyor roller and wherein:
(a) said elastomeric means is co-axially carried by a roller shaft support;
(b) said roller shaft support comprises of co-axially spaced first and second support means; and
(c) said first support means has an aperture adapted to receive an end of said conveyor roller to support said conveyor roller.

13. A method as claimed in claim 12 wherein said elastomeric means is comprised of rubber which is vulcanized; and said vulcanized rubber connects said first support means to said second support means.

14. A method as claimed in claim 12 further including die step of inserting the shaft at least one end of said conveyor roller into the roller shaft support for retaining and supporting said conveyor roller.

15. A method of dampening the transmittal of vibrations from a conveyor roller to a conveyor assembly by providing elastic means between said conveyor roller and said conveyor assembly, wherein said elastic means is co-axially carried by a roller shaft support; said roller shaft support comprising of co-axially spaced first and second support means and said elastic means disposed between and bonded to said first and second support means; and said first support means has an aperture adapted to receive an end of said conveyor roller to support said conveyor roller wherein said conveyor assembly includes a frame; and wherein said second support means is adapted to be fastened to said frame to connect said roller shaft support to said conveyor assembly.

* * * * *